United States Patent [19]

Howard

[11] Patent Number: 4,699,447

[45] Date of Patent: Oct. 13, 1987

[54] OPTICAL BEAM SCANNER WITH ROTATING MIRROR

[75] Inventor: P. Guy Howard, Junction City, Oreg.

[73] Assignee: Spectra-Physics, Inc., San Jose, Calif.

[21] Appl. No.: 834,284

[22] Filed: Feb. 27, 1986

[51] Int. Cl.⁴ .............................................. G02B 26/08
[52] U.S. Cl. ...................................... 350/6.9; 350/6.7
[58] Field of Search ................................... 350/6.7, 6.9

[56] References Cited

U.S. PATENT DOCUMENTS 3,632,871  4/1969  Watkins ................................. 350/6.9
4,409,478  10/1983 Libby ..................................... 350/6.9

OTHER PUBLICATIONS

IBM Technical Disclosure Bulletin, Spiral Disc Scanner, by D. E. Rutter, vol. 5, No. 4, Sep. 1962.

Primary Examiner—Bruce Y. Arnold
Assistant Examiner—Vincent J. Lemmo
Attorney, Agent, or Firm—Donald C. Feix; Paul Davis; T. M. Freiburger

[57] ABSTRACT

An optical scanner apparatus particularly suited for use in a laser bar code reader includes a series of mirrors mounted in a basket-like array about the optical beam axis. A mirror is mounted obliquely across the beam axis, directly on the path of the beam, to fold the beam generally radially outwardly toward the array of mirrors. In one embodiment of the invention the oblique first mirror is rotated about the beam axis, while in another embodiment the oblique first mirror is held stationary and the array of mirrors is rotated, to reflect the beam forwardly, generally in the direction the beam axis is pointing. If the oblique first mirror rotates, a plurality of scan lines, including non-parallel scan lines, are formed on a surface to be scanned; if the array of mirrors is rotated instead of the single mirror, a series of parallel scan lines will be produced. The mirrors can be oriented at desired angles to produce virtually any desired scan pattern. In a preferred embodiment a central tubular member or spindle is hollow and within it are located some components of a laser, to shorten the length of the overall assembly into a more compact configuration.

20 Claims, 8 Drawing Figures

OPTICAL BEAM SCANNER WITH ROTATING MIRROR

BACKGROUND OF THE INVENTION

The invention relates to optical beam scanning devices, and more particularly to a scanning device for producing a plurality of scan lines using one or more rotating mirrors.

Optical beam scanning devices, particularly those in laser bar code readers, are in wide use. A variety of types of scanning mechanisms exist. These include resonant reciprocating scanners in which spring-loaded vibration or reciprocation causes a mirror to reciprocate and thus reflect a laser beam to produce a scan line, and other forms of scanning mechanisms involving rotational elements for effecting position and orientation changes in one or a plurality of mirror surfaces to generate the desired scan pattern. Typical slot scanners used in retail stores, for example, generating non-parallel pairs of scan lines, utilizing rotating components for manipulating mirrors. In such scanners, generally multiple pairs of parallel lines are produced from a single laser beam.

In general, the existing systems for use in generating a plurality of scan lines, particularly involving non-parallel scan lines, are relatively complex in structure and adjustment. Therefore, there has been a need for a simple scanning mechanism having relatively few parts, which is dependable and versatile for producing any of a variety of desired scanning patterns.

SUMMARY OF THE INVENTION

In accordance with the present invention, a scanning device for producing a multiple scan line pattern including non-parallel scan lines employs a basket-like array of tilted mirrors surrounding an optical beam axis. The optical beam is folded by a first oblique mirror and directed radially outwardly toward the array of mirrors. Relative rotation is effected between the first oblique mirror and the array of mirrors to reflect the beam in a desired scanning pattern. As the beam traverses each mirror of the array, an individual scan line is formed.

In general, the apparatus of the invention includes a housing for connection to a beam generator projecting a beam along a beam axis, with a first mirror mounted in the housing obliquely with respect to the beam on the beam axis, in position to intercept and fold the beam to direct it generally radially outwardly from the beam axis. A plurality of mirrors are disposed radially outwardly with respect to the beam axis and spaced away from the beam axis, with each oriented on a tilt angle with respect to the beam axis and in generally basket-shaped array. Each mirror of the basked-shaped array is so oriented that when it receives the folded beam it redirects the beam generally in the direction of the beam axis.

Rotational means are operatively connected to the obliquely angled mirror and to the basket-shaped array of mirrors, for permitting relative rotation of the mirror array and the oblique first mirror about the beam axis. This causes the folded beam to sweep across each mirror of the basket-shaped array of mirrors in succession to scan the beam to project generally a plurality of scan lines on a surface to be scanned. A motor is included to effect the relative rotation.

In one embodiment of the invention, the basket-like array of mirrors is held stationary, and the central oblique mirror on the beam axis is rotated. The result is a scan pattern of multiple non-parallel scan lines and the scan lines can be in many different configurations. With six mirrors in the basket-like array, it is possible to generate a scan pattern comprising three non-parallel pairs of scan lines, as in a typical slot scanner. Six (or any number of) scan lines, can be formed, none of which are parallel, and the scan lines may be made to intersect in a central intersection area. This is accomplished by adjustment of the individual mirror orientations in the basket-like array.

In another embodiment the basket-like array of mirrors is rotated with the central mirror on the beam axis held stationary. This produces a different type of scan pattern, generally comprising a series of parallel scan lines, exhibiting some curvature.

The angles at which the individual mirrors are oriented in the basket-like array determines the resulting scan pattern. If each mirror were planar and mounted symmetrically about the laser beam and rotational axis, forming a symmetrical polygonal array in axial view, the beam scanner would form scan lines which are generally not desirable. In the second described embodiment all scan lines would be coincident with each other, that is, one scan line repeated for each mirror. However, changes in the angular relationship of a mirror with respect to the beam axis will affect the position of the resulting scan line, moving the line's position lateraly as projected on a surface. Similarly, changes in the mirror's angular orientation with respect to an opposite axis will shift the position of the projected scan line generally longitudinally with respect to the scan line. Therefore, a number of desired patterns of scan lines can be formed by manipulating the angular orientations of the individual mirrors.

In a preferred embodiment of the invention, the laser is of a special compact design. The capillary bore tube of a gas laser is configured with a portion of the capillary bore tube lying inside a hollow shaft associated with a rotor for rotating the mirror or mirrors. This enables a shorter overall length and efficiently conserves space to result in a compact configuration particularly suitable for hand held laser scanners.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
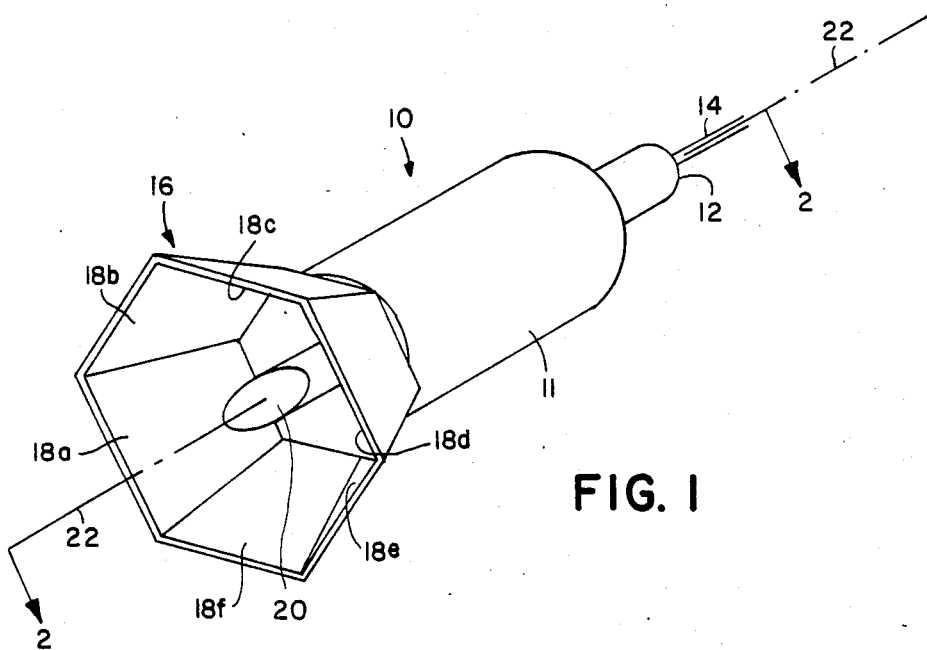
FIG. 1 is a frontal perspective view showing an optical beam scanning device particularly suited for use in a laser scanning device, wherein the desired reflection of the beam is achieved by sweeping a beam against a basket-like array of angled mirrors, in accordance with the principles of the invention.

In the drawings, FIG. 1 shows a beam scanner device 10 in accordance with the invention. The principal components of the scanner 10 are a housing member 11 having an optical beam input opening 12 at its rear side for the entry of a beam 14, a front mirror mount 16 supporting a basket-like array of planar mirrors 18, and a central obliquely-oriented mirror 20 located on the beam axis 22, for reflecting the beam against the array of mirrors 18. The reverse side of the mirror 20 is seen in FIG. 1.

Figure 2:
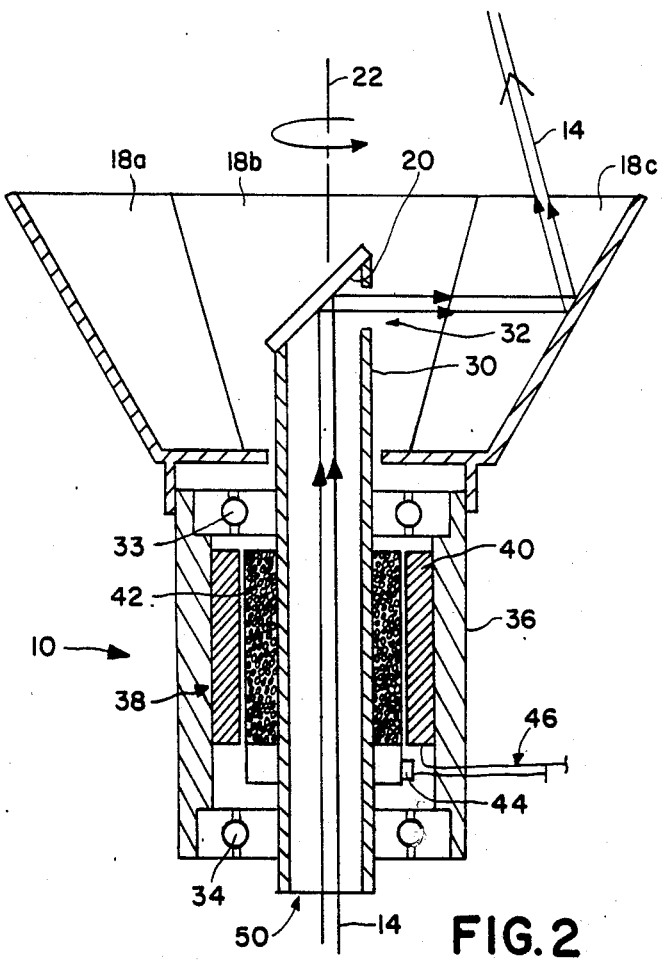
FIG. 2 is a transverse cross sectional view of the laser scanning device, as seen generally along the lines 2—2 in FIG. 1.

The beam scanner device 10 is shown in sectional view in FIG. 2. The central oblique mirror or first mirror 20 is rotatable about the beam axis 22, so as to fold the beam 11 to redirect it radially outwardly while sweeping it in a circular path around the basket-like array of mirrors. The result is that the beam sweeps across one mirror 18a, then across the adjacent mirror 18b, the next mirror 18c, etc. This produces a projected scan pattern of six discrete scan lines. If the mirrors 18 are, for example, six in number and all at similar angular orientations and of similar size, the resulting scan pattern would be something approximating a hexagon, but with goverlapping and crossing scan lines. The pattern would contain pairs of parallel lines, in three non-parllel pairs. However, this generally is not a desired scan pattern, so by manipulating the angular orientations of the mirrors 18a, 18b, etc., one can obtain other more useful scan patterns. If the mirrors are even in number in corresponding opposed pairs, the pattern will include pairs of parallel scan lines, each pair being non-parallel to the other pairs.

Figure 4:
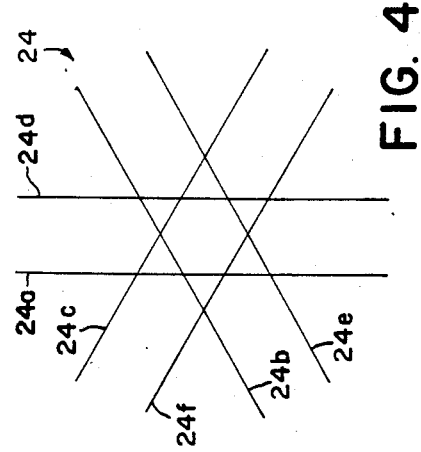
FIG. 4 shows a scan pattern which can be achieved with the scanner of the invention. In this example, the scan pattern comprises six separate scan lines, in three non-parallel pairs.

For example, FIG. 4 shows one pattern which can be achieved simply by adjusting the tilt angles of the mirrors. By tilting the mirrors 18a and 18b, for example, (see FIG. 1), at a steeper angle, i.e. to a sharper inward inclination, scan lines 24a and 24d can be obtained. By similarly adjusting the tilt of the mirrors 18b and 18e, the parallel scan lines 24b and 24e shown in FIG. 4 will result. The same is true with the remaining pair of mirrors 18c and 18f, and the corresponding scan lines 24c and 24f.

Figure 5:
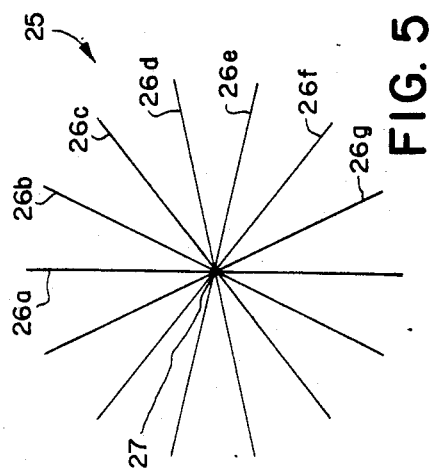
FIG. 5 shows another example of a scan pattern that can be achieved with the scanner of the invention, comprising a large plurality of non-parallel and intersecting scan lines.

It is also possible to produce a scan pattern 26 such as shown in FIG. 5, comprising a large number of scan lines 26a, 26b, 26c, 26d, etc., none of which are parallel. The scan lines can intersect or approximately intersect, at a central intersection area 27. This scan pattern 26 will assure that a bar code is read regardless of the rotational orientation of the scanning device.

To produce the scan pattern 26 shown in FIG. 5, the number of mirrors 18 in the device must equal the number of scan lines 26a, 26b, etc. to be generated. Each mirror must have an outer edge which is not parallel to any other mirror's edge, or, stated another way, a transverse line across a mirror, lying in a plane which is perpendicular to the optical axis of the input beam, must not be parallel to a similar line on any other mirror. If the mirrors are arranged generally symmetrically, this will require an odd number of mirrors.

Figure 3:
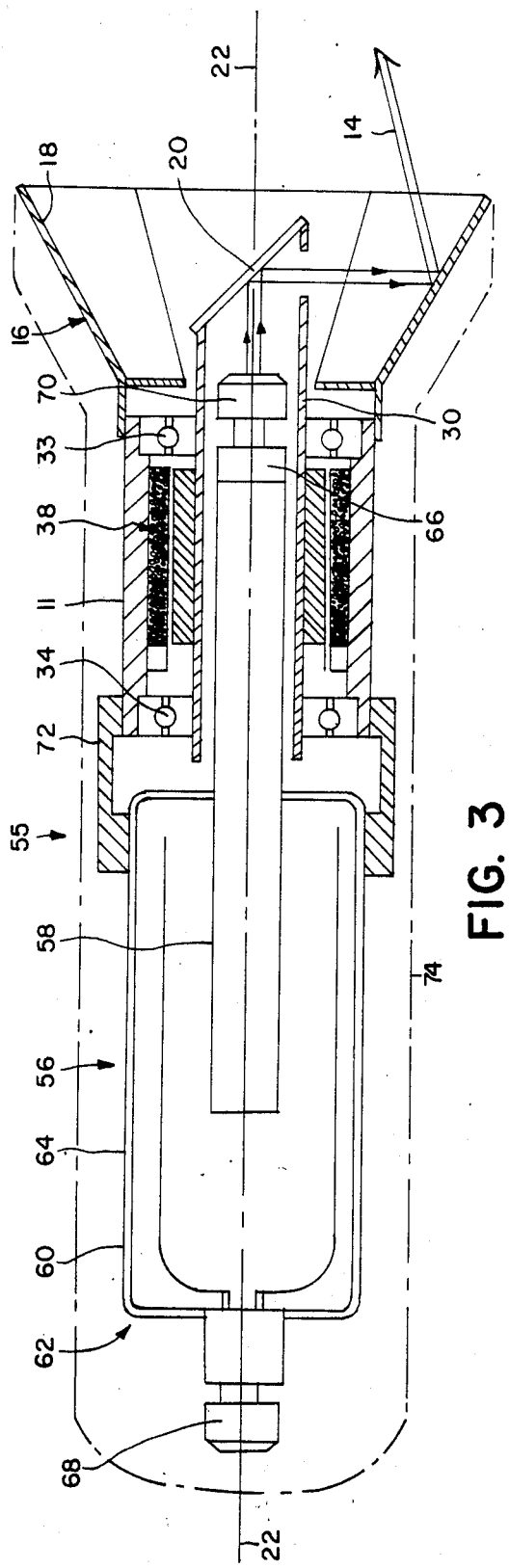
FIG. 3 is a further transverse cross sectional view of the laser scanner of the invention, in a particular embodiment wherein the laser is a gas laser.

Preferred constructions of the beam scanner device 10 are shown in FIGS. 2 and 3. In FIG. 2 it is seen that the device 10 includes a hollow motor spindle 30, on the end of which is mounted the obliquely angled mirror 20. The oblique angle should eliminate any curved component from the resulting scan be 45° to eliminate any curved component from the resulting scan lines. An appropriate opening 32 is formed in the hollow motor spindle 30, in position to permit the scanning beam to pass through so that it may strike each mirror 18 of the basket-like array. The hollow motor spindle 30 is mounted on bearings 33 and 34 within a tubular housing member 36, and an electric motor 38 is positioned coaxially between the motor spindle 30 and the housing member 36. The motor spindle 30 serves as the armature of the motor 38. The motor stator is shown at 40, motor windings at 42, and brushes at 44. Lead wires 46 extend from the motor for ultimate connection to a source of power.

It can be seen from FIG. 2 that the light beam 14 enters through a rear opening 50 in the hollow motor spindle 30, passes through the motor spindle and reflects off the rotating obliquely angled mirror 20. The beam 14 is deflected radially outwardly in a sweeping path, preferably in a plane normal to the optical axis 22 of the input beam, in the preferred case where the mirror 20 is at a 45° angle to the input beam and the hollow motor spindle.

The beam sweeping across the mirrors produces a pattern of lines, one for each mirror, as discussed above.

FIG. 3 shows another form of scanner device 55, similar in principle and in nearly all structural features to the scanner 10 of FIGS. 1 and 2, but differing in respect of the use of a particular type of laser which takes advantage of the hollow motor spindle 30 for making a compact overall scanner device 55 of relatively short length. This efficient structure is particularly useful in hand-held beam scanners.

The housing component 11, the motor 38, the bearings 33 and 34, and the basket-like array of mirrors 18 on the mirror mount 16, as well as the rotating obliquely angled mirror 20 on the beam axis 22, may all be as described previously with respect to the scanner 10. In this embodiment, the scanner 55 incorporates a gas type laser 56, of the type having a long external capillary tube 58. The laser 56, which may be a helium-neon laser, also includes a cathode 60 at a cathode end 62 of a plasma tube 64, an anode end 66 at the end of the external portion of the capillary tube 58, and a cathode end mirror coupling 68 and an anode end mirror and exit window assembly 70.

As illustrated in FIG. 3, the external portion of the long capillary 58 extends into and is positioned inside the rotatable hollow motor spindle 30 of the beam scanner device. In this way, the length requirement of the motor 38 is overlapped with the length requirement of the external capillary tube 58 and a compact laser scanner assembly 55 results.

The stationary laser 56 may be secured to the stationary scanner housing component 11 by any suitable connection, indicated somewhat schematically at 72 in FIG. 3.

For hand-held scanners, there is also included an outer housing 74, shown schematically in dashed lines in FIG. 3.

Figure 6:
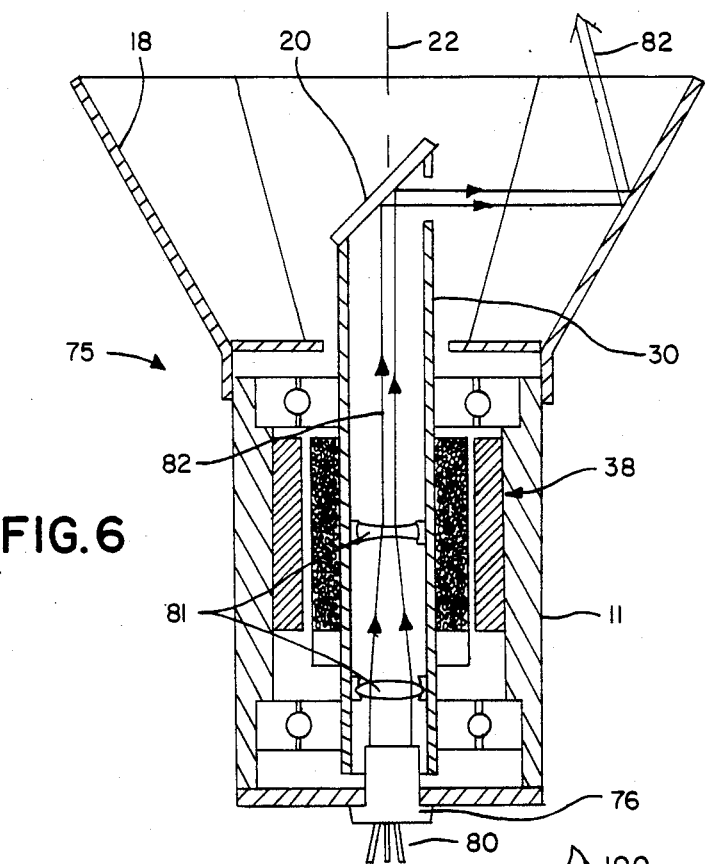
FIG. 6 is a transverse sectional view showing another embodiment of the scanner of the invention, wherein a laser diode is used as the laser source.

FIG. 6 shows another embodiment of the invention 75, again including scanning components essentially the same as those shown in FIGS. 1 and 2. In this embodiment a laser diode 76 is mounted at the back end of the housing component 11 of the scanner, on a back plate 78 secured to the housing component. Lead wires 80 are shown at the back of the diode 76.

Although the laser diode 76 is mounted stationarily in the laser scanner device 75, optical components 81 for the laser diode's beam 82 are positioned inside the rotational hollow motor spindle 30, and may be fixed to the spindle and thus rotational with respect to the diode 76. As seen in FIG. 6, the laser beam 82 from the diode 76, after processing by the optics 81 within the motor spindle 30, strikes the obliquely angled mirror 20, and is swept around the array of mirrors, as described above.

In the embodiment 75 of the invention, a very compact laser scanner assembly results from the use of a laser diode rather than a longer laser including a plasma tube, as in gas lasers, and also from the fact that the optics 81 for the laser diode's beam are located within the motor spindle 30, further reducing overall length.

Figure 7:
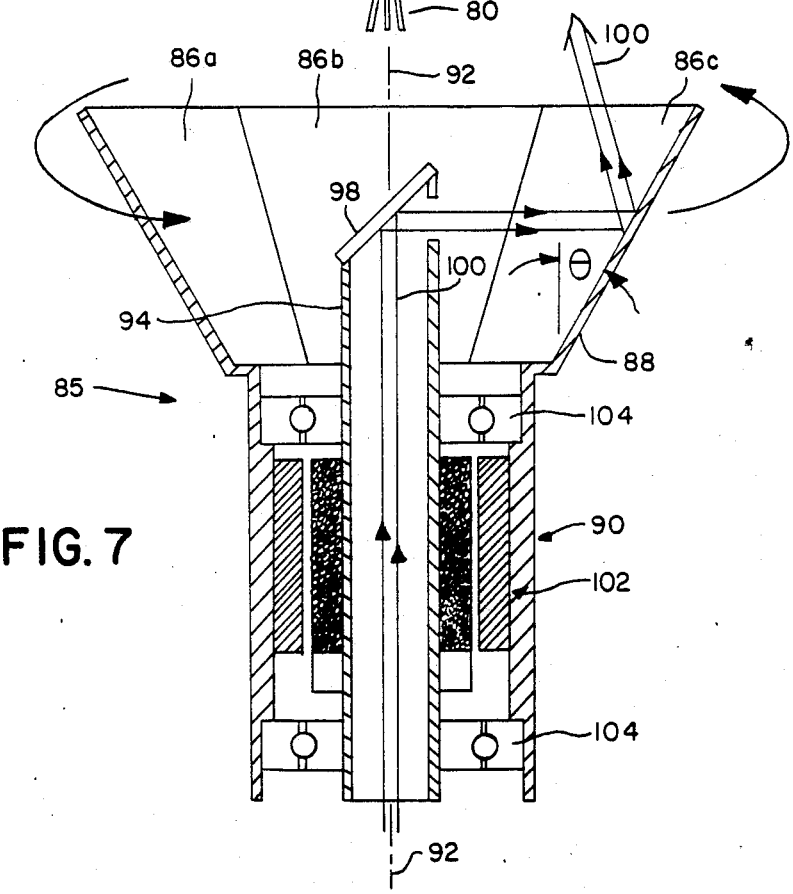
FIG. 7 is a transverse cross sectional view showing another form of the invention, wherein the basket-like array of mirrors rotates, resulting in a different scan pattern.

FIG. 7 shows in cross section another embodiment 85 of an optical beam scanning device, with some similar components to those of the other described embodiments 10, 55 and 75, but differing substantially in concept and in the resulting beam pattern generated.

As indicated in FIG. 7, the beam scanner 85 has a plurality of mirrors 86a, 86b, 86c, etc. in a basket-like array, fixed to a mirror mount 88 which is in turn fixed to or integral with a cylindrical rotational unit 90 extending axially back and concentric with the beam axis 92.

Within the scanner 85, immediately surrounding the beam axis 92, is a fixed tubular member 94 in the position of the rotating motor spindle 30 in the previously discribed embodiments. The fixed tubular member 94 does not rotate but is secured to fixed portions of the scanner 85. In this form of the invention the array of mirrors 86 rotates, rather than the central mirror.

The tubular member 94 supports the obliquely angled central mirror 98 positioned on the beam axis 92, so that the optical beam 100 is redirected approximately radially outwardly as indicated, so that it will strike the mirrors of the basket-like array as they rotate encircling the central mirror 98. The reflected beam 100 is then projected forwardly to produce a desired scan pattern.

A motor 102, which may be similar to the motor 38 of the previous embodiments, is interposed between the cylindrical rotatable shell 90 and the fixed tubular member 94 within, and bearings 104 appropriately support the shell 90 and the mirror mount 88 for rotation.

It is apparent that, if the mirrors 86a, 86b, etc. were all planar mirrors all mounted at similar angles and symmetrical about the beam axis 92, the scanner would repeatedly project a single scan line, with all mirrors producing scan lines lying in the identical location.

Figure 8:
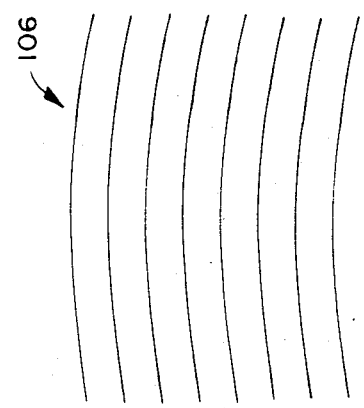
FIG. 8 shows a scan pattern which can be produced from the embodiment of the scanner device shown in FIG. 7, comprising a plurality of parallel curved scan lines.

However, if the mirrors are oriented at different tilt angles, i.e. different angles with respect to the beam axis (and axis of rotation) 92, then a scan pattern 106 similar to that shown in FIG. 8 will be produced. This is because, as can be envisioned from the angle of view shown in FIG. 7, a succession of different mirror tilt angles $\theta$ will successively change the resulting angle at which the beam 100 emerges from the scanner device as the mirrors sweep past the beam projected from the stationary oblique mirror 98. Thus, a mirror 86 angled more steeply inwardly with respect to the beam axis 92, i.e. making a smaller angle 0 with the beam axis 92, will project a fan of reflected light which angles upwardly more to the left as viewed in FIG. 7.

Variations of the scan pattern 106 can be generated with the beam scanning apparatus shown in FIG. 7. For example, by varying the orientation of each mirror 86 in a direction normal to that of the tilt angle $\theta$ discussed above, i.e., by rotating the mirror orientation about a longitudinal axis of the mirror, these scan lines can be moved longitudinally staggering them if desired.

The scanning device 85 may be used in conjunction with a laser of any suitable type, such as the two types of laser shown and described with reference to FIGS. 3 and 6, or the beam 100 may comprise another source of collimated light of sufficient power to serve the desired scanning functions.

It should be understood that, although beam scan patterns are described and illustrated herein as including scan "lines", these lines will not be truly linear as produced by the second embodiment of the invention shown in FIG. 7. They will actually include a slight curvature due to the geometry of a tilted mirror rotating about a remote center and a stationary beam directed at that mirror. In short sweeps of the beam across the mirror, by suitable choice of the geometry of the mirrors, the curvature of these scan lines can be very little, and the pattern defined approaches linear scanning.

While I have illustrated and described the preferred embodiments of my invention, it is to be understood that these are capable of variation and modification, and I therefore do not wish to be limited to the precise changes and alterations as fall within the purview of the following claims.

I claim:

1. A laser bar code scanning device, comprising,
   a housing for connection to a beam generator projecting a beam along a beam axis,
   a first mirror mounted within the housing obliquely with respect to the beam on the beam axis, in position to intercept and fold the beam to direct it generally radially outwardly from the beam axis,
   a plurality of mirrors disposed radially outwardly with respect to the beam axis and spaced away from the beam axis, each oriented on a tilt angle with respect to the beam axis and successively positioned in a generally basket-shaped array, each mirror of the basket-shaped array being so oriented that when it receives the folded beam it redirects the beam generally in the direction of orientation of the beam axis,
   rotational means operatively connected to the obliquely angled mirror and to the basket-shaped array of mirrors, for permitting relative rotation of the mirror array and the oblique first mirror about the beam axis so that the folded beam sweeps across each mirror of the basket-shaped array of mirrors in succession to scan the beam to project generally a plurality of scan lines on a surface to be scanned, and motor means for effecting said relative rotation.

2. The optical beam scanning device of claim 1, wherein the basket-shaped array of mirrors is stationary with respect to the housing and the oblique first mirror is rotational, and including a hollow tubular spindle at the outer end of which the oblique first mirror is secured and through which the optical beam passes in approaching the oblique mirror, with an opening in the hollow tubular spindle for exit of the beam, after reflection off the oblique mirror, toward the array of mirrors.

3. The optical beam scanning device of claim 2, wherein the hollow tubular spindle comprises an armature of the motor means, the motor means being in surrounding relationship to the hollow spindle, between the spindle and the housing.

4. The optical beam scanning device of claim 1, including a hollow spindle positioned concentrically about the beam axis and at the end of which the oblique first mirror is secured, and wherein the motor means comprises an electric motor operatively connected between the hollow spindle and the basket-shaped array of mirrors, the spindle forming a center member of the motor and the motor being disposed concentrically around the spindle.

5. The optical beam scanning device of claim 4, wherein the beam generator comprises an external capillary tube type gas laser, having a plasma tube with a capillary tube extending out of the plasma tube and being positioned at least partially within the hollow spindle of the scanning device, with a laser beam output window at the end of the capillary tube and positioned to deliver the beam against the oblique first mirror.

6. The optical beam scanning device of claim 4, wherein the beam generator comprises a laser diode mounted fixedly with respect to the housing, and optical components for the laser diode positioned within the hollow spindle for processing the beam and directing it toward the oblique first mirror.

7. The optical beam scanning device of claim 6, wherein the housing comprises the housing of a hand-held scanner.

8. The optical beam scanning device of claim 5, wherein the housing comprises the housing of a hand-held scanner.

9. The optical beam scanning device of claim 1, including means for generating a scan pattern including a plurality of non-parallel scan lines.

10. The optical beam scanning device of claim 9, wherein the scan pattern includes pairs of spaced parallel scan lines, including a plurality of non-parallel such pairs.

11. The optical beam scanning device of claim 9, wherein all the scan lines approximately intersect at a central location.

12. The optical beam scanning device of claim 1, including means for generating a scanning pattern comprising a series of spaced generally parallel scan lines.

13. The optical beam scanning device of claim 12, wherein the generating means comprises the first oblique mirror being stationary with respect to the housing, and the basket-shaped array of mirrors being rotational with respect to the housing and the oblique first mirror, with the mirrors of the array being at different tilt angles with respect to the beam axis.

14. A laser bar code scanning device, comprising, a housing connected to a laser beam generator projecting a beam along a beam axis, a first mirror mounted in the housing obliquely with respect to the beam on the beam axis, for folding the beam to direct it outwardly from the beam axis, a plurality of successively positioned mirrors radially outwardly disposed at selected tilt angles with respect to the beam axis and in a generally basket-shaped array of mirrors, with means for effecting relative rotation of the array of mirrors and the oblique first mirror, about the beam axis, and each mirror being so oriented that when it passes through the path of the folded laser beam, it redirects the beam generally in the direction of orientation of the beam axis but defining a scan line as the beam moves across the mirror.

15. The optical beam scanning device of claim 14, including a hollow tubular spindle coaxial with the beam axis and fixed with respect to the housing, with the oblique first mirror secured to the end of the spindle, and wherein the means for effecting rotation comprises an electric motor disposed concentrically around the spindle, and a rotating component secured to the array of mirrors and positioned concentrically adjacent to the motor, so that the motor drives the concentric rotating component with respect to the tubular spindle.

16. A method for scanning an optical beam, comprising, directing a collimated optical beam along a beam axis, positioning an obliquely angled mirror in the path of the beam, crossing the beam axis, so as to fold the beam approximately 90° in a direction generally radial with respect to the beam axis, rotating the obliquely angled mirror about the beam axis, to cause the folded beam to sweep generally in a plane outwardly from the beam axis, and positioning in the path of the sweeping beam a plurality of successively positioned angled mirrors, radially outwardly disposed and at tilt angles with respect to the beam axis and in a generally basket-shaped array, all of the mirrors being oriented to reflect the sweeping beam and redirect it generally in the direction of orientation of the beam axis, but each mirror causing the beam to scan generally in a line when projected onto a surface to be scanned.

17. A method according to claim 16, wherein the mirrors of the basket-shaped array are at such individual tilt angles as to produce a plurality of non-parallel scan lines on the surface to be scanned.

18. A method for scanning an optical beam, comprising, generating an optical beam and directing it along a beam axis, positioning in the path of the beam and across the beam axis an obliquely angled first mirror for folding the beam in a generally radially outward direction, positioning radially outwardly of the beam axis and the oblique mirror a generally basket-shaped array of successively positioned mirrors, each oriented at a tilt angle with respect to the beam axis and in the path of the folded beam, and effecting relative rotation between the oblique first mirror and the basket-shaped array of mirrors, to thereby cause the folded beam to sweep across each mirror of the array in succession and to produce a desired scan pattern comprising a plurality of scan lines, one from each mirror of the basket-shaped array.

19. A method according to claim 18, wherein the step of effecting relative rotation comprises rotating the oblique first mirror while holding the basket-shaped mirrors stationary, to thereby produce a scan pattern including a plurality of non-parallel scan lines.

20. A method according to claim 18, wherein the step of effecting relative rotation comprises holding the oblique first mirror stationary while rotating the basket-shaped array of mirrors, to produce a scan pattern comprising a plurality of parallel scan lines.

* * * * *

REEXAMINATION CERTIFICATE (1322nd)
United States Patent [19]
Howard

[11] B1 4,699,447
[45] Certificate Issued    Jul. 3, 1990

[54] OPTICAL BEAM SCANNER WITH ROTATING MIRROR

[75] Inventor: P. Guy Howard, Junction City, Oreg.

[73] Assignee: Spectra-Physics, Inc., San Jose, Calif.

Reexamination Request:
No. 90/001,819, Aug. 9, 1989

Reexamination Certificate for:
Patent No.: 4,699,447
Issued: Oct. 13, 1987
Appl. No.: 834,284
Filed: Feb. 27, 1986

[51] Int. Cl.$^5$ .............................. G02B 26/10
[52] U.S. Cl. ........................ 350/6.9; 350/6.7
[58] Field of Search ............. 350/6.5, 6.7, 6.9, 6.1, 350/6.6, 6.8, 6.91, 486; 235/467, 454; 346/160; 358/199

[56] References Cited

U.S. PATENT DOCUMENTS

| | | | |
|---|---|---|---|
| 3,632,871 | 1/1972 | Watkins et al. | 350/486 |
| 3,978,317 | 8/1976 | Yamaguchi et al. | 250/236 |
| 4,409,469 | 10/1983 | Yasuda et al. | 235/463 |
| 4,418,276 | 11/1983 | Yatsunami | 235/462 |

FOREIGN PATENT DOCUMENTS

| | | | |
|---|---|---|---|
| 0141417 | 6/1986 | Japan | 350/6.8 |
| 1393535 | 5/1975 | United Kingdom | 350/6.6 |

OTHER PUBLICATIONS

A. Hildebrand, "Generating Multi-Dimensional Scan Using A Single Rotating Component", SPIE vol. 84, Laser Scanning Components & Techniques (1976), pp. 85–90.

*Primary Examiner*—Bruce Y. Arnold

[57] ABSTRACT

An optical scanner apparatus particularly suited for use in a laser bar code reader includes a series of mirrors mounted in a basket-like array about the optical beam axis. A mirror is mounted obliquely across the beam axis, directly on the path of the beam, to fold the beam generally radially outwardly toward the array of mirrors. In one embodiment of the invention the oblique first mirror is rotated about the beam axis, while in another embodiment the oblique first mirror is held stationary and the array of mirrors is rotated, to reflect the beam forwardly, generally in the direction the beam axis is pointing. If the oblique first mirror rotates, a plurality of scan lines, including non-parallel scan lines, are formed on a surface to be scanned; if the array of mirrors is rotated instead of the single mirror, a series of parallel scan lines will be produced. The mirrors can be oriented at desired angles to produce virtually any desired scan pattern. In a preferred embodiment a central tubular member or spindle is hollow and within it are located some components of a laser, to shorten the length of the overall assembly into a more compact configuration.

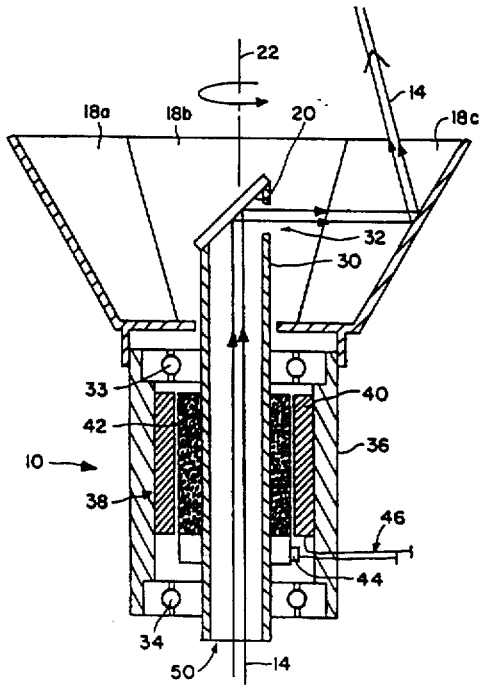

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14, 16 and 18 are determined to be patentable as amended.

Claims 2-13, 15, 17, 19 and 20, dependent on an amended claim, are determined to be patentable.

New claims 21-32 are added and determined to be patentable.

1. A laser bar code scanning device, comprising,
a housing for connection to a beam generator projecting a beam along a beam axis,
a first mirror mounted within the housing obliquely with respect to the beam on the beam axis, in position to intercept and fold the beam to direct [it] *the folded beam* generally radially outwardly from the beam axis,
a plurality of mirrors disposed radially outwardly with respect to the beam axis and spaced away from the beam axis, each oriented on a tilt angle with respect to the beam axis and successively positioned in a generally basket-shaped array *more than 180° around said beam axis*, each mirror of the basket-shaped array being so oriented that when it receives the folded beam it redirects the beam generally in the direction of orientation of the beam axis,
rotational means operatively connected to the [obliquely angled] *oblique first* mirror and to the basket-shaped array of mirrors, for permitting relative rotation of the [mirror] array *of mirrors* and the oblique first mirror about the beam axis so that the folded beam sweeps across each mirror of the basket-shaped array of mirrors in succession to scan the beam to project generally a plurality of scan lines on a surface to be scanned, and
motor means for effecting said relative rotation.

14. A laser bar code scanning device, comprising,
a housing connected to a laser beam generator projecting a beam along a beam axis,
a first mirror mounted in the housing obliquely with respect to the beam on the beam axis, for folding the beam to direct [it] *the folded laser beam* outwardly from the beam axis,
a plurality of successively positioned mirrors radially outwardly disposed at selected tilt angles with respect to the beam axis and *arranged* in a generally basket-shaped array [of mirrors] *more than 180° around said beam axis*, with means for effecting relative rotation of the array of mirrors and the oblique first mirror [,] about the beam axis, and
each mirror being so oriented that when it passes through the path of the folded laser beam, it redirects the beam generally in the direction of orientation of the beam axis but defining a scan line as the beam moves across the mirror.

16. A method for scanning an optical beam, comprising,
directing a collimated optical beam along a beam axis,
positioning an obliquely angled mirror in the path of the beam, crossing the beam axis, so as to fold the beam approximately 90° in a direction generally radial with respect to the beam axis,
rotating the obliquely angled mirror about the beam axis, to cause the folded beam to sweep generally in a plane outwardly from the beam axis, and
positioning in the path of the sweeping beam a plurality of successively positioned angled mirrors, radially outwardly disposed [and] at tilt angles with respect to the beam axis and *arranged* in a generally basket-shaped array *more than 180° around said beam axis*, all of the mirrors being oriented to reflect the sweeping beam and redirect it generally in the direction of orientation of the beam axis, but each mirror causing the beam to scan generally in a line when projected onto a surface to be scanned.

18. A method for scanning an optical beam, comprising,
generating an optical beam and directing it along a beam axis,
positioning in the path of the beam and across the beam axis an obliquely angled first mirror for folding the beam in a generally radially outward direction,
positioning radially outwardly of the beam axis and the oblique mirror a generally basket-shaped array of successively positioned mirrors *more than 180° around said beam axis*, each *mirror being* oriented at a tilt angle with respect to the beam axis and in the path of the folded beam *so as to direct the folded beam generally in the direction of the beam axis*, and
effecting relative rotation between the oblique first mirror and the basket-shaped array of mirrors, to thereby cause the folded beam to sweep across each mirror of the array in succession and to produce a desired scan pattern comprising a plurality of scan lines, one from each mirror of the basket-shaped array.

*21. The optical beam scanning device of claim 1, wherein said basket-shaped array redirects said folded beam substantially throughout a 360° rotation of said first mirror relative to said basket-shaped array.*

*22. The optical beam scanning device of claim 21, wherein said folded beam sweeps 360° relative to said basket-shaped array.*

*23. The optical beam scanning device of claim 21, wherein said first mirror has a single reflecting surface.*

*24. The optical beam scanning device of claim 14, wherein said basket-shaped array redirects said folded beam substantially throughout a 360° rotation of said first mirror relative to said basket-shaped array.*

*25. The optical beam scanning device of claim 24, wherein said folded beam sweeps 360° relative to said basket-shaped array.*

*26. The optical beam scanning device of claim 24, wherein said first mirror has a single reflecting surface.*

*27. A method according to claim 16, wherein said basket-shaped array redirects said folded beam substantially throughout a 360° rotation of said obliquely angled mirror relative to said basket-shaped array.*

28. A method according to claim 27, wherein said folded beam sweeps 360° relative to said basket-shaped array.

29. A method according to claim 27, wherein said obliquely angled mirror has a single reflecting surface.

30. A method according to claim 18, wherein said basket-shaped array redirects said folded beam substantially throughout a 360° rotation of said first mirror relative to said basket-shaped array.

31. A method according to claim 30, wherein said folded beam sweeps 360° relative to said basket-shaped array.

32. A method according to claim 30, wherein said first mirror has a single reflecting surface.

* * * * *